May 3, 1960

J. A. ROSS 2,935,672

DISPLACEMENT-ACCELERATION CONTROL CIRCUITS

Filed Feb. 14, 1957

INVENTOR.
JAMES A. ROSS

BY *Harry R. Lubcke*

AGENT

United States Patent Office 2,935,672
Patented May 3, 1960

2,935,672

DISPLACEMENT-ACCELERATION CONTROL CIRCUITS

James A. Ross, San Fernando, Calif., assignor to Ling-Altec Electronics, Inc., Dallas, Tex., a corporation of Delaware Application February 14, 1957, Serial No. 640,213

14 Claims. (Cl. 318—128)

My invention relates to an electrical circuit for comparing electrical energies and particularly to one for selecting the electrical energy of predominant amplitude of a plurality in a manner suited for the control of a system producing said energies.

In the art of electrically produced mechanical vibration it is essential that the vibrations produced be under control for a number of reasons. The electrical to mechanical transducer, the equivalent of a radio loudspeaker and often called a vibrator or "shaker," is easily damaged if the amplitude of the displacement of the armature, or moving portion, is excessive. Also, improvement in this art has led to the practice of production testing and damage to the product must be avoided from all causes.

In simple vibration tests it is customary to start at a low frequency and to slowly increase the frequency until the highest frequency of interest is reached. It is usual to attach an accelerometer to the specimen or to the table of the shaker in order to determine the acceleration ("g's") to which the specimen is being subjected. From fundamental mechanics it is apparent that the acceleration increases with frequency for a given amplitude of vibration; that is, displacement. If acceleration alone is the parameter upon which the system is controlled, destructively large amplitudes of vibration will occur at low frequencies. Consequently, means must be provided to limit the vibrational displacement at low frequencies.

The prior art has accomplished this in a rather primitive way. It has been practice to observe the displacement in some manner and to manually adjust the amplitude of the electrical drive to prevent abnormal displacements. When a variable frequency sweep oscillator has been employed as the origin of the vibrations, others have placed an electrical contact on the frequency variation dial thereof to switch control of the system from displacement-sensitive means associated with the vibrating element for low frequencies to an acceleration-sensitive means similarly associated for high frequencies. Such an arrangement is obviously effective only with particular oscillators so equipped, is not capable of effecting control when other vibration sources are employed, nor to control mal-operation or emergencies. As the art has progressed it has been possible to simulate actual conditions of vibration, as by preparing an electrical record on magnetic tape simulating the vibrations encountered in the take-off, flight and landing of an aircraft or missile, and by utilizing this record as the driving signal for a vibrational system.

The need for a control circuit that constantly monitors the program being fed through the system and applies preset limits of either displacement or acceleration automatically thereto is evident. Particularly is this true because the operator is primarily engaged in investigating the performance of the specimen rather than to simultaneously attempt to protect the system and the specimen from abnormal vibration.

Briefly, I achieve displacement-acceleration control by amplifying electrical energies originated by displacement and acceleration transducers at the specimen to a level sufficient for accurate rectification. Two plural stage amplifiers are employed, one for displacement and another for acceleration. The amplification of each is initially adjusted by the operator to represent safe limits, or any limits less than safe limits prescribed by a particular test. A voltage-doubler double-diode rectifier is connected to the output of each said amplifier. The rectified output of the displacement rectifier is connected in positive polarity to the input of a resistive-capacitive low pass filter. The rectified output of the acceleration rectifier is connected in negative polarity to the same input, there being resistive isolation for each rectifier at said input connection.

The grid of a small thyratron is connected to the output of the filter. When the acceleration rectified output is the greater a negative potential is fed to said grid and the thyratron remains non-conducting. The plate of said thyratron is connected to a source of alternating voltage electrical energy, the usual 60 cycle power mains, for example, through a coil type relay. Contacts upon said relay and the usual retaining spring thereof coact to connect the acceleration signal to further means beyond this invention to control the gain of the amplifier system feeding the electromechanical transducer when the thyratron is non-conducting.

When the displacement rectified output is the greater a positive potential is fed to the grid of the thyratron and the latter conducts. This alters the contact configuration of the relay and connects the displacement signal to the further means.

The inherent time constant of the low pass filter requires that the signal from one rectifier sensibly exceed that of the other before the control is transferred. This prevents "hunting," i.e., a spurious repeated exchange of control at the threshold of cross-over. Likewise, the alternating voltage applied to the plate of the thyratron makes that device self-resetting each one-sixtieth of a second and so capable of assuming a conducting or non-conducting condition automatically in consonance with the potential impressed upon the grid thereof. Additional contacts on the relay illuminate pilot lights to indicate which signal is controlling the system.

An object of my invention is to provide a control circuit for switching control of an electrical system to either of two operating parameters thereof depending upon the relative amplitudes of each.

Another object is to provide an electrical control circuit for comparing two variable signals that will not "hunt."

Another object is to provide a switching circuit capable of automatic resetting in a small interval of time.

Another object is to provide an automatic means for effecting either displacement or acceleration control of an electromechanical vibration system which depends upon the relative amplitudes of said displacement and said acceleration of the vibrating elements thereof.

Other objects of my invention will become apparent upon reading the following detailed specification and upon examining the accompanying drawings, in which.

Figure 1:
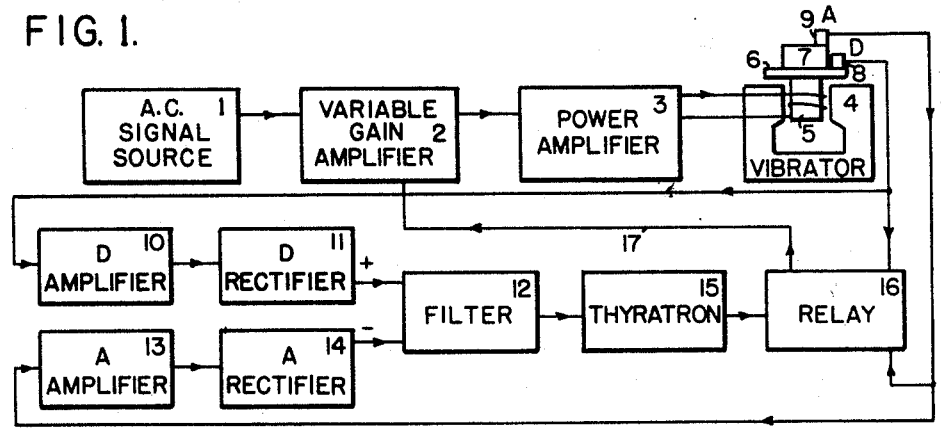
Fig. 1 shows a block diagram of my invention and coactive elements.

In Fig. 1 numeral 1 represents an alternating current signal source, such as a beat frequency oscillator, a tape recording of simulated airplane vibration, etc. Variable gain amplifier 2 adjusts the electrical gain of the vibration system to maintain the mechanical vibration constant with respect to a linear parameter such as displacement or with respect to a rate parameter such as velocity or acceleration. Details of this device are given in my copending application, Serial Number 547,234, filed November 16, 1955, now U.S. Patent 2,844,777, granted July 22, 1958. Power amplifier 3 is an audio frequency power amplifier having a power output of from a few hundred watts to nearly a half million watts depending upon the construction thereof. Vibrator 4 accepts this power and transduces it to mechanical vibration. Armature 5 is resiliently supported and vibrates integrally-attached table 6. Element 7 is the specimen under test, securely fastened to table 6. Usually upon the table or otherwise incorporated in the armature structure is a displacement transducer D, numeral 8, which provides an electrical output proportional to the amplitude of displacement of the table. Similarly, an accelerometer A, numeral 9, provides an electrical output proportional to the acceleration of the specimen.

The above elements are not a part of this invention per se, but are intimately coactive therewith. They are described to provide an understanding of a typical embodiment of the invention.

In the invention proper an electrical connection is made from the displacement transducer D to the input of the D amplifier, 10, the output of which is connected to the D rectifier 11. The resulting rectifier electrical output is impressed upon low pass filter 12. In an analogous manner an electrical connection is made from the acceleration transducer A to the input of the A amplifier 13, the output of which is connected to the A rectifier 14. The resulting rectified electrical energy here is also impressed upon filter 12, but in opposite polarity to that impressed from the D rectifier 11, thereby establishing opposed electrical datums. A single output from the filter is impressed upon the control electrode of thyratron 15. This either fires the thyratron into the conducting state if the positive voltage from the D rectifier is greater than the negative voltage from the A rectifier, or allows the same to remain nonconducting if the reverse is true. Relay 16 connects to the thyratron and is also provided with connections to the transducers D and A and with output connection 17 to the control portion of variable gain amplifier 2. The relay connects the D transducer thereto if the D output is larger than that of A and vice versa; the thyratron-relay combination constituting alternate connective means to automatically transfer control of the whole system to either the displacement or the acceleration parameter, depending upon which is larger.

Figure 2:
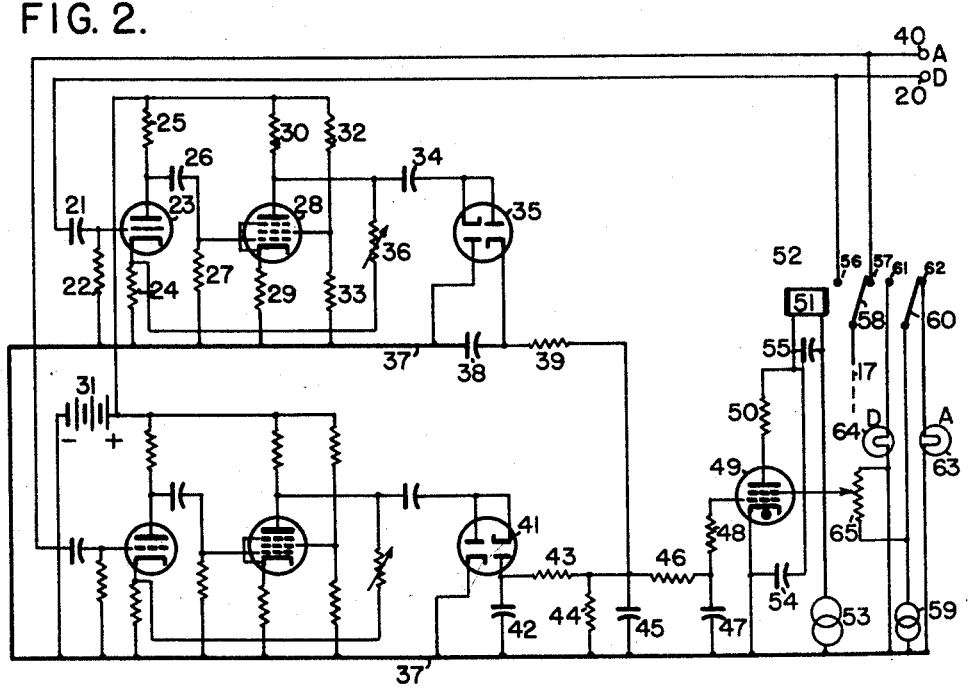
Fig. 2 is the schematic circuit diagram for my invention.

We now turn to Fig. 2 for the detailed circuit of my invention; those elements 10 through 16 in Fig. 1. Terminal 20 represents the input from the D transducer. It is connected through coupling capacitor 21 and over grid return resistor 22 to the grid of triode 23. The time constant of this RC circuit should be fairly long, such as 0.1 second, so that very low audio frequencies will not be attenuated. Cathode resistor 24 is unbypassed and provides self bias to this stage, of which resistor 25 is the plate resistor.

Capacitor 26 and resistor 27 compose the input circuit to the control grid of pentode 28. While this input circuit also has a long time constant I have often utilized a value half as large as the one previously mentioned. Vacuum tubes 23 and 28 may be contained in one envelope and be of the 6AN8 type. An anti-oscillation resistor (not shown) of several thousand ohms may or may not be included in series with the control grid of tube 28. Resistor 29 is the unbypassed cathode resistor for tube 28 while resistor 30 is the plate resistor for the same.

A plate supply battery 31 provides a positive potential for the plates of each tube through the plate resistors mentioned and also to the screen grid of tube 28 through the voltage divider 32, 33. The absence of a bypass capacitor at the screen will be noted, and that because of the very low audio frequencies that must be handled. The amplified D signal is taken from the plate of tube 28 and passed through capacitor 34 to one cathode and one plate of double diode 35. Capacitor 34 has relatively low reactance to the frequencies involved by having a capacitance of the order of a quarter of a microfarad.

Resistor 36 is also connected to the plate of tube 28 and to the cathode of tube 23 besides, thereby constituting a feedback path for maintaining the gain of the D amplifier constant regardless of power supply variations, aging of tubes, etc. A preferred resistance value is of the order of a fraction of a megohm. This resistor is shown variable for the purpose of adjusting the gain of the D amplifier to suit the output of a particular D transducer, to meet the requirements of a particular test, and so on. This gain may, of course, be adjusted at other points in the D portion of the circuit and resistor 36 may then be of the fixed type.

The remaining plate of the double diode 35 is connected to the common return (or "ground") conductor 37 and the remaining cathode to the junction between capacitor 38 and resistor 39. The capacitor is part of the filter, as is the resistor, but the latter also acts as an isolating impedance between the D and the A rectifiers. Capacitor 38 has a value of a fraction of a microfarad and resistor 39 a value of a fraction of a megohm. The cathode output of diode 35 gives a positive polarity to the rectified electrical energy therefrom.

In Fig. 2 as in Fig. 1 the A amplifier is directly below the D amplifier. Normally, these amplifiers are identical, save for the connection of the diodes. Accordingly, in Fig. 2 terminal 40 represents the input from the A transducer and this connects to a two stage amplifier identical to that previously described, save that diode 41 is connected oppositely with respect to the connections of diode 35. The plate output from diode 41 gives a negative polarity to the rectified electrical energy therefrom. The said plate is connected to the junction between capacitor 42 and resistor 43, which elements also function as explained above.

The two rectified and partially filtered outputs from the D and A portions of the circuit are joined across shunt-connected resistor 44 and capacitor 45. The former has a value of the order of one megohm and the latter a value of the order of one microfarad. These, and subsequent series-connected resistor 46 and shunt capacitor 47, having similar values to those recited, constitute a low pass filter and accomplish quite complete filtering of the rectified energy, reducing the same to a relatively smooth potential. A further similar resistor 48 is the grid circuit current-limiting resistor for thyratron 49. The time constant of the whole filter is sufficiently long so that the output thereof as a potential change lags somewhat behind the combination of D and A signals producing the same. In the general case, where one of these entities takes the control from the other, the increasing one increases sensibly beyond the exact threshold level for transfer as each instant of time passes. The delay of the filter thus introduces a hysteresis effect that prevents exchange of control back and forth between the D and A entities, i.e., prevents "hunting."

Thyratron 49 is of small size, with a plate current rating in the hundred milliampere range. According to thyratron behavior, this tube conducts when the inner (control) grid becomes positive, perhaps to only a slight degree, depending upon the internal construction of the thyratron. When that grid is negative, however, the tube will not change from the non-conducting to the conducting phase. The filtered electrical energy from diodes 35 and 41 is constituted to either fire or not fire the thyratron, as the case may be.

Resistor 50 limits the plate current of thyratron 49. Connected in series with that resistor is actuating coil 51 or relay 52. The other connection of the coil is connected to alternator 53. This represents a source of alternating electrical energy having a voltage of a few hundred volts. In the practical case it may be the secondary of a transformer. Capacitor 54 is of relatively small capacitance and is employed to inhibit radio frequency discharges in the thyratron, a source of general interference if allowed to occur. Capacitor 55 is of relatively large capacitance to maintain relatively constant current through relay coil 51 while the A.C. fed thyratron is between conduction cycles.

Two sets of double throw contacts are preferably provided on relay 52. Contact 56 is connected to the D transducer and contact 57 to the A transducer. I prefer to have the A contact make connection with the relay switch arm 58 when the relay 52 is not energized and with the D contact 56 when it is energized. Arm 58 is connected to conductor 17, which conveys the selected output of the D or the A transducer to the variable gain amplifier, as shown in Fig. 1.

A desirable indicating function is carried out by the other contacts of the relay. A second source of alternating current electrical energy 59 is provided, preferably of considerably lower voltage than that of alternator 53. This is connected to arm 60 of the relay. When this arm is in contact with contact 62 the circuit is completed through incandescent lamp A, 63. This lamp is then illuminated and indicates that the accelerometer signal is in control of the vibration system. Likewise, when arm 60 is in contact with contact 61 the D lamp 64 is illuminated and indicates that the displacement parameter is in control.

A potentiometer 65 is connected across alternating current source 59, the variable arm of which connects to the screen grid of thyratron 49. This allows proper adjustment of the firing of this tube.

While the use of coaxial cable shielded conductors has not been shown for sake of clarity, high impedance signal-carrying connections such as those associated with the grid and plate circuits of the D and A amplifiers may be thus shielded. This decreases the level of interference interaction between the two and also the level of externally induced interference.

By interchanging the D and A connections to contacts 56 and 57 of relay 52 the system control may be taken by the smaller rather than by the larger of the D or A output from the transducers. This type of control is not usually desired, but the ease of altering my invention to accomplish this is of interest. The connections to contacts 61 and 62 would also normally be interchanged in a modification of this type.

Also, the polarities of the output connections of rectifiers 35 and 41 may be interchanged to effect inversion of control.

By substituting a velocity transducer means for either the displacement or the acceleration transducers shown the velocity parameter may be one of the control agents. It is also possible to utilize an electrical output originating from the specimen itself, should this be electrical apparatus or be provided with suitable such apparatus. Such an output is connected to either of the A or D terminals, Fig. 2, if this be alternating current, or at the outputs of rectifiers 35 and/or 41 if the energy be direct current. Finally, a fully external control may be imposed by similar connections, one example being ambient temperature in a heat run.

It will be understood that battery 31 may be replaced by the usual A.C. to D.C. power supply, which need not be regulated.

Either or both of the D and A transducers may include one or more stages of amplification if needed to provide substantially equal electrical outputs of sufficient amplitude to be conveyed over connection leads well in excess of the random electrical noise level.

The types of tubes in the A and D amplifiers are not critical, a triode or tetrode may be used in place of a pentode, and so on. The feedback circuit tends to give needed constancy regardless of tube characteristics or power variations.

While the application of my invention illustrated is typical, it will be appreciated that its selection function may be employed in industrial control systems, to alter control as between barometric pressure and temperature in missile trajectory, and so on.

It is also possible to control certain operations by means of the conductive or the non-conductive state of the thyratron 49 itself in lieu of relay 52.

Other modifications in the characteristics of the circuit elements, details of circuit connections and alteration of the coactive relation between the elements may be taken without departing from the scope of my invention.

Having thus fully described my invention and the manner in which it is to be practiced, I claim:

1. An electrical circuit for comparing electrically represented parameters comprising first means for continuously electrically representing one said parameter, electronic means connected thereto to establish an electrical datum corresponding to said representation, second means for continuously electrically representing another said parameter, second electronic means connected thereto to establish another electrical datum, rectifier means connected to said electronic means and to said second electronic means to combine rectified representations of said data in amplitude opposition, and further means energized by alternating electrical energy and connected to said rectifier means to alter said electrical circuit upon a change of the amplitude of either of said data.

2. An electrical circuit for comparing alternating electrical energy comprising means to constitute an amplitude of electrical energy proportional to one entity to be compared, a first opposed double rectifier connected thereto to rectify that electrical energy, other means to constitute an amplitude of other electrical energy proportional to another entity to be compared, a second opposed double rectifier connected thereto to rectify said other electrical energy, an electrical amplitude smoothing filter having an electrical time delay, said first and second rectifiers connected in opposite electrical polarity to said filter, an alternate connective switch connected to said filter, said switch adapted to pass electrical energy proportional to either said one entity or to said other entity depending upon either being greater and after a time interval equal to said time delay, and alternating current electrical means to energize said switch.

3. An electrical circuit for comparing two and selecting one alternating electrical energies comprising means for forming a magnitude of electrical energy proportional to one entity to be compared, a first voltage-doubler rectifier connected thereto to rectify said electrical energy, other means for forming a magnitude of electrical energy proportional to another entity to be compared, a second voltage-doubler rectifier connected thereto to rectify the second electrical energy, an electrical filter having a time constant to smooth said rectified electrical energy to approximately direct current, said first and second rectifiers connected in opposite electrical polarity to said filter, switch means, said switch means connected to said filter, said switch means adapted to pass electrical energy proportional to either said one entity or to said other entity depending upon the magnitude of either being sensibly greater than that of the other for a time interval in excess of the period of said time constant, and upon a reversal of the relation between said entities to pass the corresponding electrical energy after a time interval related to said time constant.

4. In a system for producing vibration, a control circuit to control said system according to one of two vibration parameters depending upon which is the larger comprising means to form an electrical signal corresponding to the amplitude of one said parameter, a first dual-opposed rectifier having an output of one polarity connected to said means; a second means to form an electrical signal corresponding to the amplitude of said second parameter, a second rectifier having a polarity of output opposite to that of said first rectifier, said second rectifier connected to said second means; an electrical smoothing filter connected to the outputs of both said rectifiers, circuit switching means operable upon electrical energy of a predetermined polarity and energized by alternating electrical energy, the input of said circuit switching means connected to said filter means, said circuit switching means constituted to connect that means-to-form-an-electrical-signal corresponding to the larger of the two said parameter signals to control said system after a time delay corresponding to the time delay of said filter.

5. The control circuit of claim 4 in which said circuit switching means coacts to connect the means to form an electrical signal corresponding to the smaller of the two said parameter signals to control said system.

6. In a system for producing vibration, an electrical device to control said system according to one of two vibration parameters comprising a transducer for a displacement said parameter, an amplifier connected to said displacement transducer, a voltage-step-up rectifier having an output of one polarity connected to said amplifier; a second transducer for a velocity said parameter, a velocity amplifier connected to said second voltage-step-up transducer, a second rectifier having an output of polarity opposite to that of said rectifier connected to said second amplifier; a low pass filter connected to the outputs of both said rectifiers, a circuit switching entity operable upon electrical energy of a predetermined polarity, said switching entity connected to said filter and composed to connect the amplifier corresponding to the said parameter associated with a predetermined polarity of the corresponding said rectifier to said device to control said system.

7. In a system for producing vibration in a specimen, electrical apparatus to control said system according to one of two parameters depending upon which is the larger comprising a mechanical to electrical transducer for one said parameter, an electrical amplifier connected to said transducer, a rectifier having an output of one polarity connected to said amplifier; means related to said specimen to produce electrical energy according to said second parameter, a second electrical amplifier connected to said means, a second rectifier having an output of polarity opposite to said rectifier, said second rectifier connected to said second amplifier; a smoothing filter connected to the outputs of both said rectifiers, a discharge-relay energized by alternating electrical energy and operable upon a predetermined level of electrical energy of predetermined polarity, said discharge-relay connected to said filter, and coacting to connect the transducer or means electrical amplifier and rectifier corresponding to the larger of the two said parameters to said discharge relay to control said system after a time interval equivalent to the electrical time delay inherent in said filter.

8. An electrical circuit for comparing two alternating voltage signals comprising an amplifier to amplify one said signal, a voltage-doubler unilateral conductor pair connected to said amplifier to rectify said one signal, a second amplifier to amplify the other signal, a second voltage-doubler unilateral conductor pair connected to said second amplifier to rectify said other signal, low pass filter means common to both said unilateral conductors connected to the first said unilateral conductor to accept the rectified one signal in one polarity and connected to the second said unilateral conductor to accept the rectified other signal in opposite polarity, discharge means having input and output electrodes, an output connection of said filter means connected to the input electrode of said discharge means, said output electrode of said discharge means connected to a source of alternating electrical voltage, said discharge means adapted to conduct only when said rectified signal in one polarity has a greater amplitude at said output connection of said filter means than that of said rectified other signal for a period of time equal to the electrical time delay inherent in said filter means.

9. An electrical circuit for comparing two and selecting one alternating voltage signals comprising an amplifier to amplify one said signal, a voltage-doubler rectifier connected to said amplifier to rectify said one signal, a second amplifier to amplify the other signal, a second voltage-doubler rectifier connected to said second amplifier to rectify said other signal, a low pass filter common to both said rectifiers connected to the first said rectifier to accept the rectified one signal in one voltage polarity and connected to the second said rectifier to accept the rectified other signal in opposite voltage polarity, a discharge tube having an input and an output, relay means, the input of said discharge tube connected to said filter and said relay means connected to the output of said discharge tube, said discharge tube adapted to conduct only when said one rectified signal has a greater amplitude at said output connection of said filter than that of said rectified other signal, and when conducting to cause said relay means to pass said one signal to an output terminal, hunting of said relay means prevented by the delay of the inherent time constant of said filter.

10. An electrical circuit for comparing two and selecting one alternating voltage signals of the same frequency comprising a plural stage amplifier to amplify one said signal, a voltage-doubler double-diode connected to said amplifier to rectify said one signal, a second plural stage amplifier to amplify the other signal, a second voltage-doubler double-diode connected to said second amplifier to rectify said other signal, a low pass filter common to both said diodes connected to the first said diode to accept the rectified one signal in positive voltage polarity and connected to the second said diode to accept the rectified other signal in negative voltage polarity, a gas thyratron having input and output electrodes, a relay, an output connection of said filter connected to the input electrode of said thyratron, said output electrode of said thyratron connected to a source of alternating electrical voltage energy through the coil of said relay, said relay connected to pass said other signal to an output terminal when said coil is not energized, said thyratron adapted to conduct when said one rectified signal has a sensibly greater amplitude at said output connection of said filter than that of said rectified other signal, and when conducting to energize said relay coil to cause said relay to pass said one signal to said output terminal, hunting of said relay prevented by the delay of the time constant of said filter and automatic cessation of conduction of said thyratron when said rectified other signal has a sensibly greater amplitude than that of said rectified one signal accomplished by virtue of said alternating voltage applied to said output electrode thereof.

11. In a system for producing vibration, control equipment for determining which of two different vibration characteristics shall control said vibration comprising means for producing electricity proportional to a linear parameter of said vibration, an amplifier connected thereto for amplifying said electricity; unilateral conductive means connected thereto for voltage-increasingly rectifying said electricity having one polarity of output, further means for producing further electricity proportional to a rate parameter of said vibration, a further amplifier connected thereto for amplifying said further electricity, further unilaterally conductive means connected thereto for voltage-increasingly rectifying said further electricity having a polarity opposite to said one polarity; a connection connecting both said rectifier means together in opposing polarity, a filter connected thereto to smooth the rectified electricity and to introduce a time delay, and polarity-sensitive means connected to said filter, said polarity-sensitive means also connected to said system-for-producing-vibration and adapted to impose control thereupon by the parameter having the greater electrical output from said filter after said time delay upon a transfer of said control.

12. The control means of claim 11 wherein the control is imposed by the parameter having the lesser electrical output from said filter.

13. In an electromechanical system for producing vibration, apparatus for electrically determining which of two vibration characteristics shall control the magnitude of the vibration comprising means for producing an alternating voltage proportional to the displacement of said vibration, an amplifier connected thereto for amplifying said voltage, a voltage-doubling rectifier connected thereto for rectifying said alternating voltage, said rectifier having a positive polarity of voltage output, further means for producing a further alternating voltage proportional to the acceleration of said vibration, a further amplifier connected thereto for amplifying said further alternating voltage, a further voltage-doubling rectifier connected thereto for rectifying said further alternating voltage, said rectifier having a negative polarity of voltage output; connective means to connect the recited rectifier outputs together, a filter connected thereto to smooth the outputs of said rectifiers to approximately a constant voltage and to introduce a time delay between the output of said rectifiers and the output of said filter, a thyratron having an input and an output, the input of said thyratron connected to the output of said filter, said thyratron adapted to conduct when the more positive of said voltage outputs prevails, an alternating voltage source connected to the output of said thyratron, and a relay also connected to the output of said thyratron, said relay arranged to connect the acceleration proportional means for control of said vibration when said thyratron is not conducting and to connect the displacement proportional means for control of said vibration when said thyratron is conducting.

14. In an electromechanical system for producing mechanical vibration, means for electrically determining which of two different vibration characteristics shall control the magnitude of the vibration comprising means for producing alternating electrical energy proportional to the displacement of said vibration, an amplifier connected to said means for amplifying said electrical energy, a voltage-doubler rectifier connected to said amplifier for rectifying said electrical energy, said voltage-doubler rectifier having a positive polarity of voltage output, further means for producing further alternating electrical energy proportional to the acceleration of said vibration, a further amplifier connected to said further means for amplifying said further electrical energy, a further voltage-doubler rectifier connected to said further amplifier for rectifying said further electrical energy, said further voltage-doubler rectifier having a negative polarity of voltage output; conductive means to connect the recited rectifier outputs together, a low pass filter connected thereto to smooth the outputs of said rectifiers to approximately a constant value and to introduce a time delay between the output of said rectifiers and the output of said filter means, a gaseous discharge tube having a grid and a plate, said grid connected to the output of said filter, said discharge tube adapted to conduct when the more positive of said voltage outputs prevails, an alternating voltage source of electrical energy connected to the plate of said discharge tube, and a relay also connected to the plate of said discharge tube, said relay arranged to connect the acceleration proportional means for control of said vibration when said gaseous tube is not conducting and to connect the displacement proportional means for control of said vibration when said gaseous tube is conducting with a delay at the transition from one connection to the other to prevent hunting.

References Cited in the file of this patent
UNITED STATES PATENTS

| | | |
|---|---|---|
| 2,322,217 | Baird | June 22, 1943 |
| 2,640,947 | Journeaux | June 2, 1953 |
| 2,844,781 | Adelman et al. | July 22, 1958 |
| 2,850,725 | Beaumont | Sept. 2, 1958 |